May 12, 1970 W. W. QUIGLEY 3,511,941

PUBLIC TELEPHONE MOUNTING

Filed Jan. 3, 1967 2 Sheets-Sheet 1

INVENTOR

WARREN W. QUIGLEY

BY Brown, Schuyler & Beveridge

ATTORNEYS

May 12, 1970 W. W. QUIGLEY 3,511,941

PUBLIC TELEPHONE MOUNTING

Filed Jan. 3, 1967 2 Sheets-Sheet 2

INVENTOR
WARREN W. QUIGLEY

BY Browne, Schuyler & Beveridge
ATTORNEYS

United States Patent Office 3,511,941

Patented May 12, 1970

3,511,941

PUBLIC TELEPHONE MOUNTING

Warren W. Quigley, Forest Park, Ga., assignor to Gladwin Industries, Inc., a corporation of Georgia Filed Jan. 3, 1967, Ser. No. 606,726

Int. Cl. H04m *1/04*

U.S. Cl. 179—146 11 Claims

ABSTRACT OF THE DISCLOSURE

A public telephone mounting assembly including a mounting plate fixed to a wall, a telephone secured to the mounting plate, and an enclosure secured on the wall independently of the telephone and mounting plate. The enclosure has a back wall including an elongated aperture which receives the mounting plate with the top edge of the aperture engaged against a flange formed on the upper back side of the mounting plate.

This invention relates to the mounting of coin or public telephones and their associated enclosures.

One of the objects of the present invention is to provide for a public telephone, a novel mounting which minimizes unauthorized removal of the telephone and consequent damage thereto such as may occur in an attempted theft.

A further object is to provide a novel method and structure facilitating the mounting of a public telephone and its associated enclosure. Included herein is the provision of such a method and structure requiring only one person to effect mounting of the telephone and its enclosure in a secure manner.

A further object is to provide a novel mounting plate for securing a telephone with respect to a support wall or the like.

Other objects and advantages will be apparent from the following detailed description in conjunction with the accompanying drawings, in which.

Figure 1:
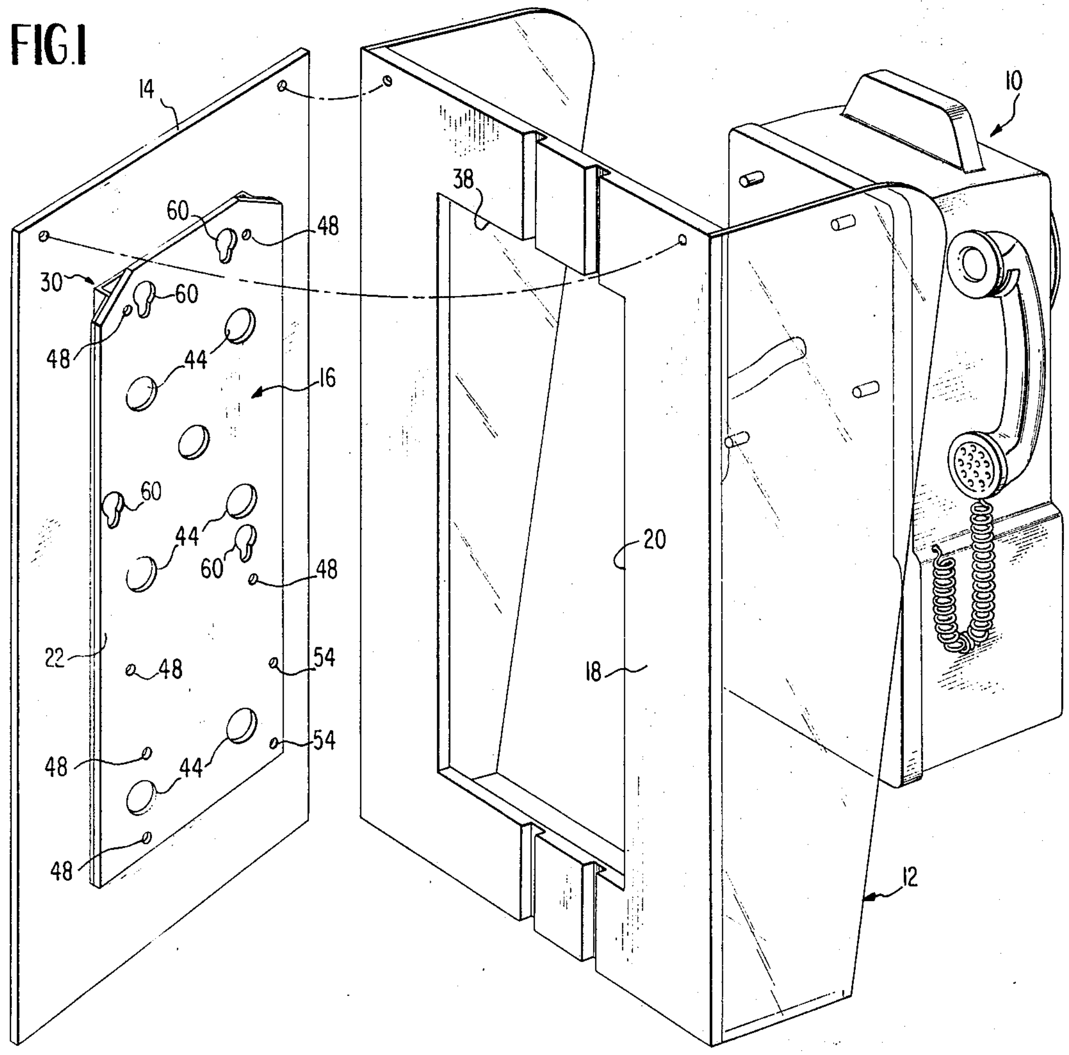
FIG. 1 is an exploded perspective view of a coin telephone, its enclosure and a mounting plate for securing the latter with respect to a support wall in accordance with the present invention.
Figure 2:
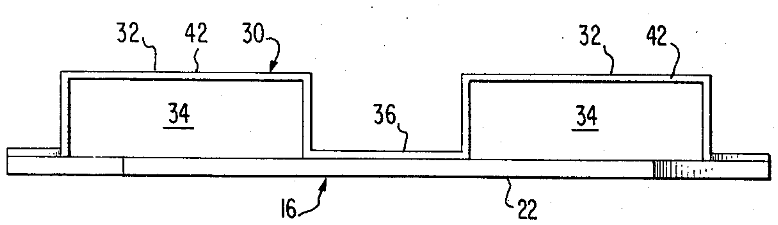
FIG. 2 is an enlarged top plan view of the mounting plate included in the assembly of FIG. 1.
Figure 3:
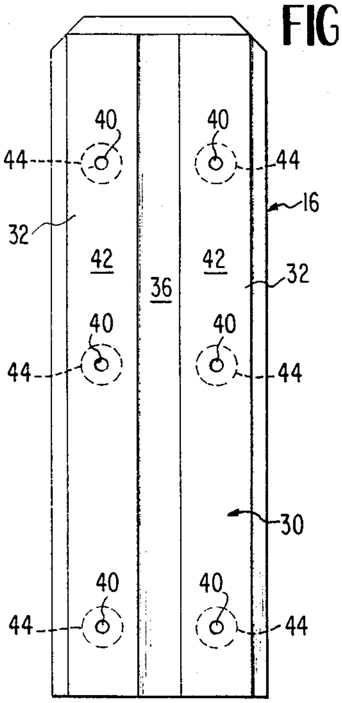
FIG. 3 is a rear elevational view of the mounting plate.
Figure 6:
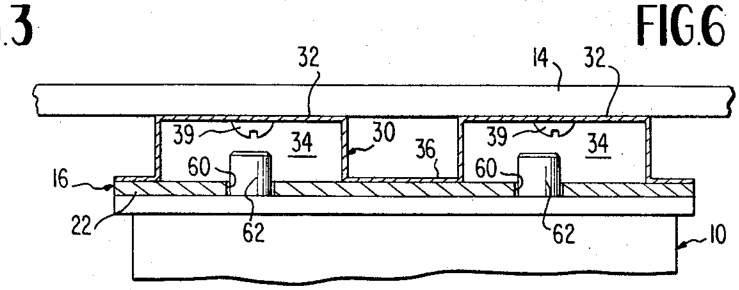
FIG. 6 is a transverse cross-sectional view of the mounting plate when attached to the support wall with the telephone in place.
Figure 7:
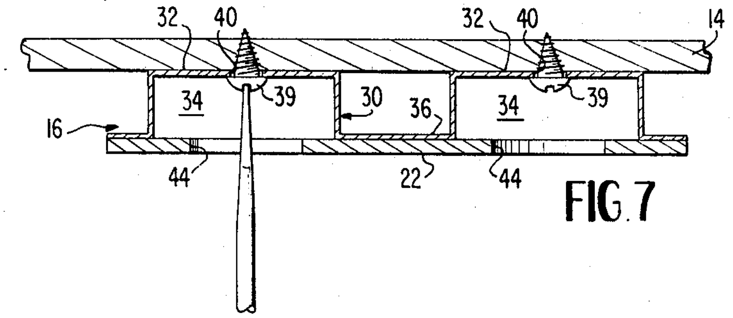
FIG. 7 is a transverse cross-sectional view of the mounting plate illustrating its securement to the support wall prior to mounting of the telephone.
Figure 8:
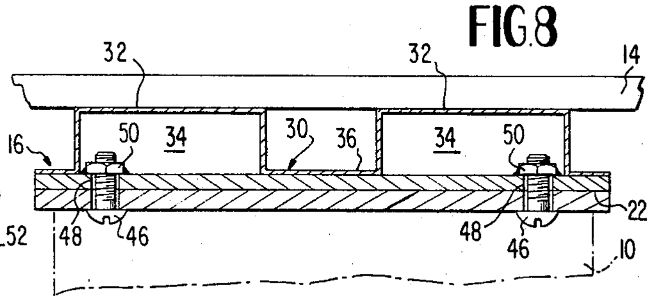
FIG. 8 is a view similar to FIG. 6 but taken at a different elevation and with the telephone shown in phantom lines.
Figure 4:
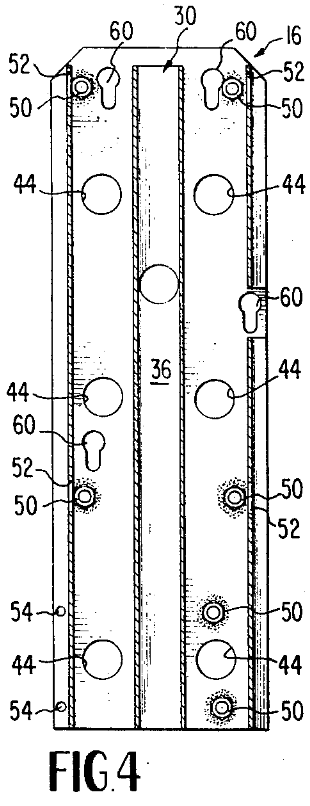
FIG. 4 is a longitudinal cross-sectional view of the mounting plate as seen from the rear side thereof.
Figure 5:
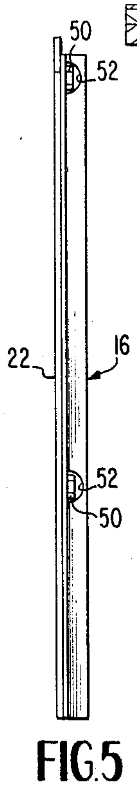
FIG. 5 is a side view of the mounting plate.
Figure 9:
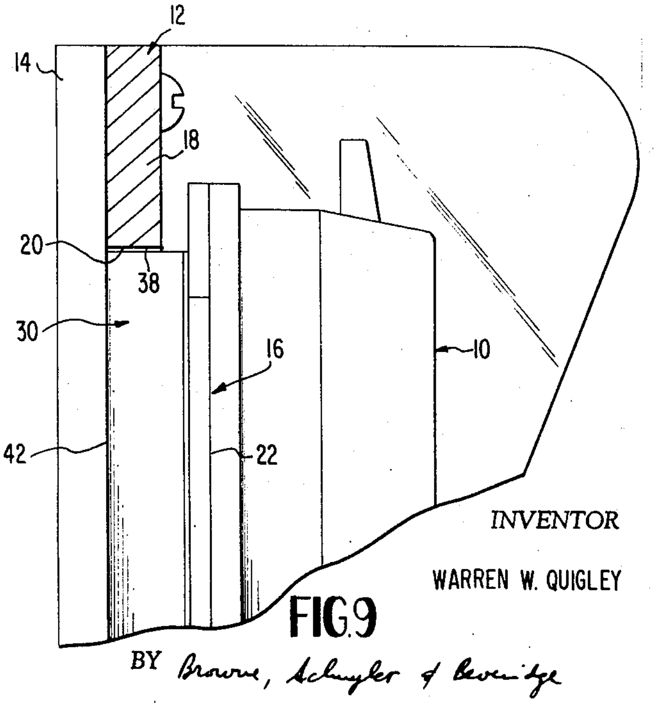
FIG. 9 is a fragmental side view of the finally mounted telephone, its enclosure and mounting plate and with a portion shown in cross section.

Referring to the drawings in detail, FIG. 1 illustrates a typical coin telephone 10 and associated enclosure 12 mounted to a wall or support member 14 in accordance with the present invention. The basic method of the invention is to secure a mounting plate generally designated 16 to the wall 14 and the telephone to mounting plate 16. Enclosure 12 is secured directly to wall 14 about the telephone, the backboard 18 of the enclosure having a cutout aperture 20 accommodating the telephone and mounting plate 16.

In the preferred embodiment, mounting plate 16 includes a flat mounting face plate 22 formed from 12-gauge sheet steel with a generally rectangular shape about 16¾ inches in length and 5⁵⁄₁₆ inches in width. Additionally mounting plate 16 includes a rear portion 30 shown as formed from channeled sheet steel of generally the same gauge and overall length and width as that of face plate 22. Rear plate 30 includes two identical U-shaped channel sections 32 extending longitudinally throughout the length of the plate and defining a pair of passages 34. Channel sections 32 are separated and interconnected by a central strip section 36 abutting the rear side of face plate 22. Channel sections 32 project rearwardly and space face plate 22 from the wall 14 so that the upper edge 38 of aperture 20 in the enclosure backboard 18 may be engaged on top of channel sections 32 which thus act as a supporting flange.

Securement of mounting plate 16 to wall 14 is by fasteners such as screws 39 received through apertures 40 shown as six in number, formed through the base portions 42 of the channel sections. Access to apertures 40 for installation or removal of the mounting plate is afforded by a second set of apertures 44 formed through the face plate 22 to respectively overlie apertures 40 and have a greater diameter, say 1 inch, than the former apertures, which may be ⁵⁄₁₆ inch in diameter.

Securement of the telephone to the mounting plate is achieved by screws or bolts 46 projecting from the back of the telephone, through a third set of apertures 48 formed through face plate 22 in communication with passages 34 in channel sections 32. Nuts 50 are fixed to the rear side of face plate 22 in passages 34 around apertures 48 respectively for receiving the fasteners 46. Access to nuts 50 is provided by apertures 52 of about ¾ inch in diameter formed through the outer side walls of channel sections 32 at the levels of nuts 50. In the shown embodiment six apertures 48 and nuts 50 are employed. Additionally, two ¼—20 tapped holes 54 are formed through the lower right hand portion of face plate 22 and rear plate 30 outwardly of the adjacent channel sections 32.

In order to position the telephone on the mounting plate with apertures 48 aligned with fasteners 46 extending from the telephone, a plurality of keyhole slots 60 shown as four in number, are provided in face plate 22. In one form of the invention key slots 60 are about 1.0 inch in overall length with the upper enlarged portion being about ¹¹⁄₁₆ inch in diameter and the lower restricted portion ⅜ inch in diameter. Key slots 60 are adapted to receive lugs 62 projecting from the telephone to thereby properly position the telephone relative to the mounting plate and to also assist in holding the telephone prior to securement to the mounting plate.

In assembly, mounting plate 16 is secured by screws 39 to support wall 14, apertures 44 providing access to screws 39 for installation. By means of keyhole slots 60 and lugs 62, the telephone may then be aligned in the mounting plate and thereafter secured by bolts 46 received through apertures 48 and nuts 50. The enclosure backboard 18 may then be placed against wall 14 with the upper edge 38 of its aperture 20 engaged against the top of channel sections 32. The backboard is then screwed directly to the wall 14 to complete the assembly. It will be appreciated that alternatively, the enclosure backboard may be secured to the wall 14 prior to securement of the telephone to mounting plate 16.

With such a mounting, it is extremely difficult to force or pry the telephone from the mounting plate because of the firm securement provided by fasteners 46 and their cooperable nuts 50. From the standpoint of security, this is far superior to the conventional mounting where the telephone is mounted to the backboard of the enclosure.

Modifications and adaptations of the present invention readily apparent from the foregoing description and associated drawings, although not specifically mentioned herein, will nevertheless be included within the scope of the present invention as indicated in the appended claims.

I claim:

1. In combination, a support wall, a mounting plate fixed to the support wall and having rearwardly projecting means at its upper end, a telephone enclosure including a backing member having an aperture, said backing member being fixed to the wall with the cut-out aperture receiving the mounting plate, the backing member having an edge defining the top portion of the aperture and engaged on said rearwardly projecting means, a telephone, and means fixing the telephone to the mounting plate independently of said backing member.

2. The combination defined in claim 1 wherein said mounting plate has a flat mounting face portion receiving the telephone and a rear portion projecting from the face portion and engaged against said wall to space the face portion from the wall, said rearwardly projecting means being formed by the upper end of said rear portion, said rear portion being dimensioned to define a number of passages extending longitudinally along the rear side of the mounting plate between the face portion and the wall, and wherein said means fixing the telephone to the mounting plate includes a first set of apertures extending through the mounting face and a number of nuts fixed in said passages about the apertures respectively.

3. The combination defined in claim 2 wherein said rear portion is formed from sheet metal and includes two generally U-shaped intermediate portions extending longitudinally of the mounting plate to define said passages, said U-shaped portions being spaced by a central flat portion engaged against the mounting face and thereby defining a central passage between said first two passages, said mounting face portion and said central portion of the rear portion having an aligned aperture receiving telephone wires with the telephone wires housed in said central passage.

4. The combination defined in claim 3 further including means fixing said mounting plate to said wall including a second set of apertures extending through said U-shaped intermediate portions, and fasteners extending through said second set of apertures and said wall.

5. The combination defined in claim 4 further including a third set of apertures formed in said mounting face portion and having a greater diameter than and aligned with said second set of apertures for providing access to said second set of apertures and fasteners for mounting or removing the mounting plate with respect to the wall.

6. A mounting plate adapted to be secured to a support wall or the like for receiving and mounting a telephone with respect to the wall, the mounting plate including a generally planar face portion adapted to receive the back of the telephone, said mounting plate further including a projecting rear portion having means defining a pair of longitudinal passages extending longitudinally on the rear side of said mounting face portion, said mounting face portion having a first set of apertures extending therethrough and communicating with said passages, a number of nuts received in said passages about said first set of apertures respectively for receiving fasteners to secure a telephone with respect to the mounting plate, said means on the rear portion defining said passages having a second set of apertures dimensioned to receive fasteners for securing the mounting plate with respect to a supporting wall or the like.

7. The mounting plate defined in claim 6 wherein said mounting face portion has a third set of apertures having a greater diameter than and aligned with the second set of apertures for providing access to said second set of apertures for assembly or removal of the mounting plate relative to a supporting wall.

8. The mounting plate defined in claim 7 wherein said rear portion projects generally normal from the plane of the mounting face portion sufficiently to provide a flange means at the upper ends of said rear portion for supporting a backing member of a telephone enclosure or the like, and means defining a central passage in the rear portion dimensioned to receive telephone wires, and wherein said mounting face portion has an aperture communicating with said central passage for leading telephone wires into said central passage.

9. The mounting plate defined in claim 8 wherein said means included in said rear portion has side portions with apertures formed therein communicating laterally with respect to the passages in the area of said nuts.

10. The mounting plate defined in claim 9 wherein said rear portion is formed from sheet metal and wherein said means included in the rear portion are generally U-shaped and wherein said rear portion includes a flat central portion integrally interconnecting said U-shaped portions.

11. A method of mounting a telephone and associated enclosure with respect to a support wall or the like, the steps comprising first securing a mounting plate with respect to the wall, securing to the support wall independently of the mounting plate a telephone enclosure having an apertured back wall, with the aperture in the back wall received about the mounting plate, and securing the telephone directly to the mounting plate independently of the telephone enclosure and after the mounting plate is secured to the wall.

References Cited

UNITED STATES PATENTS

| | | | |
|---|---|---|---|
| 3,247,332 | 4/1966 | McHugh | 179—183 |
| 3,300,917 | 1/1967 | Bartley et al. | 52—36 |

WILLIAM C. COOPER, Primary Examiner

U.S. Cl. X.R.

52—36; 179—183